3,769,412
METHOD OF TREATING VASCULAR
THROMBOSIS
John Leheup Archibald, Windsor, and Kenneth Heatherington, Burnham, England, assignors to John Wyeth & Brother Limited, Maidenhead, England
No Drawing. Filed May 15, 1972, Ser. No. 253,518
Claims priority, application Great Britain, May 18, 1971, 15,430/71
Int. Cl. A61k 27/00
U.S. Cl. 424—270     8 Claims

ABSTRACT OF THE DISCLOSURE

β-(2-p-chlorophenyl-thiazol - 4 - yl)-acrylic acid and its pharmaceutically acceptable salts and acid addition salts are useful in treating or preventing vascular disease, particularly vascular thrombosis, in mammals.

---

This invention relates to thiazole derivatives, to a process for preparing them, to pharmaceutical preparations containing the derivatives and to a method of using them.

U.K. patent specification No. 1,237,194 relates to a pharmaceutical composition comprising a thiazole of the general formula

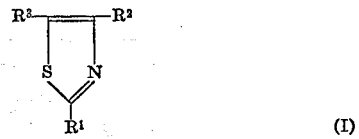

or an acid addition salt thereof, (in which $R^1$ is a substituted or unsubstituted aryl radical which may be a heteroaryl radical, $R^2$ is an n-propionic or acrylic acid radical or a salt, ester, amide or hydroxamic acid derivative thereof and $R^3$ is a hydrogen atom or a lower alkyl radical containing 1 to 4 carbon atoms), and a pharmaceutically acceptable carrier, with the proviso that when $R^1$ is unsubstituted phenyl or mono- or di-methoxy-phenyl and $R^2$ is a propionic or acrylic acid radical or an ester thereof, the said carrier excludes water and the common organic solvents.

We have now found that certain thiazoles falling within the above general formula possess advantageous anti-thrombotic properties not possessed, or not possessed to such an extent, by the remaining members of the group. Accordingly the present invention concerns β-(2-p-chlorophenyl-thiazol-4-yl)-acrylic acid or a pharmaceutically acceptable salt or acid addition salt thereof. These compounds are not exemplified in U.K. patent specification No. 1,237,194 nor does the prior specification disclose that any of the compounds have anti-thrombotic properties.

The compounds of the present invention are of value in the treatment or prevention of vascular disease, particularly in the treatment or prevention of vascular thrombosis in mammals. Accordingly the present invention provides a method of treating or preventing vascular disease, particularly vascular thrombosis, in mammals which comprises administering to the mammal a therapeutic amount of β-(2-p-chlorophenyl-thiazol-4-yl)-acrylic acid or a pharmaceutically acceptable salt or acid addition salt thereof. The mammal may be, for example, a mouse, rat, rabbit, dog, cat, monkey or the like but it is preferably a human.

The active compounds may be administered alone or in the form of a pharmaceutical composition. The pharmaceutical compositions comprise β-(2-p-chlorophenyl-thiazol-4-yl)-acrylic acid or a pharmaceutically acceptable salt or acid addition salt thereof in association with a pharmaceutically acceptable carrier. The carrier for the compositions can be solid, liquid or mixed solid-liquid, and any suitable carrier known in the art can be used. The particular carrier chosen will depend on the actual compound, the desired method of administration and standard pharmaceutical practice. The compositions may be in the form of, for example, tablets, capsules or solution.

The proportion of carrier to active compound will be determined by the solubility and chemical nature of the carrier, the chosen route of administration and standard pharmaceutical practice. The active compounds may, for example, be administered orally or parenterally. For example, they may be administered orally in unit dose form for example as tablets, capsules and the like. They may also be administered orally in the form of solutions or they may be injected parenterally. For parenteral administration they may be used in the form of a sterile solution or suspension containing other solutes, for example enough saline or glucose to make the solution isotonic.

The dosage of the present agents will vary with the form of administration and the particular compound chosen. Furthermore, it will vary with the particular subject under treatment. Generally, treatment is initiated with small dosage substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects. In general, 10 to 5000 mg./day of the acid should be suitable for an average adult. Preferred oral recommended amounts are 100 to 3500 mg./day, particularly 200 to 1500 mg./day, e.g. 500 mg./day.

The active compounds can be prepared by the general processes described in U.K. patent specification No. 1,237,194. For example, 4-formyl-2-p-chlorophenyl-thiazole can be condensed with malonic acid or an ester thereof.

Preferably the active compound is in the form of the free acid. The salts can be prepared from the free acid in known manner as can the acid addition salts although the acid addition salts are unstable, particularly under moist conditions.

The anti-thrombotic properties of the active compounds of the present invention have been demonstrated in in vitro and in vivo pharmacological tests by the effect of the compounds on blood platelets.

Blood platelet aggregation is believed to be the initial step in thrombus formation and it is considered that compounds which prevent aggregation or reduce platelet adhesiveness may inhibit the initiation of the arteriosclerotic process. The effect of drugs on aggregation is measured in platelet rich plasma (PRP) containing adenosine diphosphate (ADP) which markedly increases aggregation in vitro and may be a physiological agent for doing so in vivo.

In the in vitro test whole blood is obtained from normal fasted male rats by cardiac puncture with siliconized Vacutainers that contain 3.8% sodium citrate. Centrifugation at 900G for 2 minutes at 15–20° C. separates the red blood cells from the PRP. The supernatant PRP is pipetted off and the remainder is centrifuged at 3000G for 10 minutes to obtain platelet poor plasma for dilution. In an automated Payton aggregometer, a cell containing 1.0 ml. of PRP is stirred at 1,100 r.p.m. and the test compound is added in 0.2 ml. of buffered saline to give an initial concentration of $5.0 \times 10^{-3}$ M or $3.1 \times 10^{-4}$ M. After 3 minutes, a concentration of ADP predetermined to yield maximal platelet aggregation followed by disaggregation (2 to 4 μM.) is added in 0.1 ml. of buffered saline. The curve of percent light transmission at 610 mμ is followed for 7 minutes. Compounds found to be active in inhibiting platelet aggregation at the initial concentration are run at lower concentrations. The results are expressed as the minimum concentration effective, i.e. the concentration which gives 50% inhibition of the induced aggregation.

In the above test, β-(2-p-chlorophenyl-thiazol-4-yl)-acrylic acid was found to cause 50% inhibition of ADP-induced platelet aggregation in rat platelet-rich plasma at a concentration of $3.1 \times 10^{-4}$ M. Similar tests were carried out with human platelet-rich plasma. It was found that a minimum effective concentration for inhibiting ADP (2 μm.)-induced aggregation in human platelet-rich plasma was $5 \times 10^{-3}$ M. Similarly β-(2-p-chlorophenyl-thiazol-4-yl)-acrylic acid is effective in inhibiting collagen induced aggregation in human PRP at a concentration of $5 \times 10^{-3}$ M. The compound is also active in inhibiting thrombin (at 0.2 unit thrombin/ml.) induced aggregation in human PRP at a concentration of $6.2 \times 10^{-4}$ M. In all of the above mentioned tests, except for the collagen induced aggregation test in human PRP, β-(2-p-chlorophenyl-thiazol-4-yl)-acrylic acid is more active than aspirin, a compound which has been suggested as a possible anti-thrombotic agent.

In the in vivo test compounds are tested for their capacity to inhibit adenosine diphosphate (ADP) induced reduction of circulating blood platelets in control and treated groups of male Sprague Dawley rats. A control cardiac blood sample is taken and the compound is given to the experimental group at a starting dose of 100 mg./kg. or lower depending on the nature of the compound under test. After 30 minutes 15 mg./kg. of ADP is injected into the leg vein. Cardiac blood samples are taken at 20, 40 and 60 seconds. The control group is given only ADP. Platelet counts are made on all blood samples with a Coulter Counter, the results plotted, and the percentage of inhibition determined. Active compounds are run at lower concentrations, and the results are expressed as the lowest dose showing significant inhibition of the ADP effect.

When administered at 10, 20, 30, 40 and 50 mg./kg. in the above test β-(2-p-chlorophenyl-thiazol-4-yl)-acrylic acid was found to have some activity at 10 mg./kg. and approximately equal high activity throughout the rest of the dosage range. In contrast, aspirin was found to have only slight activity at 50 mg./kg. In a modification of the above procedure, rats were challenged with ADP at 1, 2 and 3 hours after the oral administration of 40 mg./kg. of β-(2-p-chlorophenyl-thiazol-4-yl)-acrylic acid instead of at 30 minutes. The compound showed good activity at 1 hour, slightly better activity at 2 hours and only a slight fall-off from the 2-hour activity at 3 hours. Thus the compound appears to have a good duration of activity.

The activity of β-(2-p-chlorophenyl-thiazol-4-yl)-acrylic acid in the above tests is surprising since compounds of closely related structure are inactive or considerably less active. For example, two of the closest relatives, β-(2-p-chlorophenyl-thiazol-4-yl)-propionic acid and β-(2-phenyl-thiazol-4-yl)-acrylic acid, which fall within the general Formula I given above, show no activity in the in vivo test at 50 mg./kg.

β-(2-p-chlorophenyl-thiazol-4-yl)-acrylic acid has been found to have low acute toxicity in experimental animals. For example the intraperitoneal and oral $LD_{50}$ values in mice (at 24 hours, 7 days and 14 days) were 622 and >2278 mg./kg. respectively. The equivalent values in rats were 675 and >1519 mg./kg.

The following examples illustrate the invention.

EXAMPLE 1

β-(2-p-chlorophenyl-thiazol-4-yl)-acrylic acid (a) 4-chloromethyl-2-p-chlorophenyl-thiazole (4 g.), hexamine (3.2 g.) and 50% aqueous acetic acid (20 ml.) was heated under reflux for 45 minutes, allowed to cool, diluted with water (100 ml.) and extracted with ether. The ether extract was washed successively with water, saturated sodium bicarbonate solution, and water, dried over $MgSO_4$ and evaporated. The oily residue crystallised on trituration with ether to give 4-formyl-2-p-chlorophenyl-thiazole (2.6 g., M.P. 120–2° C.).

*Analysis.*—Found (percent): C, 53.51; H, 2.76; N, 5.83. $C_{10}H_6ClNOS$ requires (percent): C, 53.70; H, 2.70; N, 6.25.

(b) A mixture of the aldehyde from part (a) of this example (2.24 g.), malonic acid (1.04 g.), pyridine (0.8 ml.) and absolute ethanol (15 ml.) was heated under reflux for 1 hour and allowed to cool. The crystalline precipitate was filtered off, washed with a little ethanol and dried by suction to give the required product (1.57 g., M.P. 221–2° C.).

*Analysis.*—Found (percent): C, 53.94; H, 3.03; N, 5.13. $C_{12}H_8ClNO_2S$ requires (percent): C, 54.25; H, 3.03; N, 5.27.

EXAMPLE 2

| | Mg. |
|---|---|
| β-(2-p-chlorophenyl-thiazol-4-yl)-acrylic acid | 125 |
| Lactose | 120 |
| Magnesium stearate | 5 |

Capsules of the above were made up by thoroughly mixing together batches of the above ingredients and filling hard gelatine capsules (250 mg.) with the mixture.

EXAMPLE 3

| | Mg. |
|---|---|
| β-(2-p-chlorophenyl-thiazol-4-yl)-acrylic acid | 125 |
| Lactose | 100 |
| Avicel | 30 |
| Dried maize starch | 40 |
| Magnesium stearate | 5 |

Tablets of the above composition were made by milling the active ingredient to 40 mesh (British Standard), sieving through a 40 mesh (British Standard) sieve, mixing the milled material with the other components nad compressing to form tablets.

We claim:
1. A method of treating vascular thrombosis in mammals which comprises administering of a mammal in need of such treatment an effective amount for treating vascular thrombosis of β-(2-p-chlorophenyl-thiazol-4-yl) - acrylic acid or a pharmaceutically acceptable salt thereof.
2. A method as claimed in claim 1 which comprises administering a pharmaceutical preparation comprising the β-(2-p-chlorophenyl-thiazol-4-yl)-acrylic acid or the salt thereof in association with a pharmaceutically acceptable carrier.
3. A method as claimed in claim 2 wherein the pharmaceutical preparation comprises β-(2-p-chlorophenyl-thiazol-4-yl)-acrylic acid in association with a pharmaceutically acceptable carrier.
4. A method as claimed in claim 3 wherein the administering is effected by the oral route.
5. A method as claimed in claim 4 wherein 10 to 5000 mg. of the β-(2-p-chlorophenyl-thiazol-4-yl)-acrylic acid is administered daily.
6. A method as claimed in claim 4 wherein 100 to 3500 mg. of the β-(2-p-chlorophenyl-thiazol-4-yl)-acrylic acid is administered daily.
7. A method as claimed in claim 4 wherein 200 to 1500 mg. of the β-(2-p-chlorophenyl-thiazol-4-yl)-acrylic acid is administered daily.
8. A method as claimed in claim 4 wherein about 500 mg. of the β-(2-p-chlorophenyl-thiazol-4-yl)-acrylic acid is administered daily.

References Cited
FOREIGN PATENTS
1,237,194   6/1971   Great Britain _____ 424—270

JEROME D. GOLDBERG, Primary Examiner